United States Patent
Fiedler et al.

(10) Patent No.: US 9,874,240 B2
(45) Date of Patent: Jan. 23, 2018

(54) COMPONENT FOR ABSORBING AND/OR TRANSMITTING MECHANICAL FORCES AND/OR MOMENTS, METHOD FOR PRODUCING SAME AND USE THEREOF

(75) Inventors: Wolfgang Fiedler, Bad Toelz (DE); Thomas Lippert, Munich (DE); Taylan Toprak, Aystetten (DE)

(73) Assignee: MT AEROSPACE AG, Augsburg (DE)

( * ) Notice: Subject to any disclaimer, the term of this patent is extended or adjusted under 35 U.S.C. 154(b) by 705 days.

(21) Appl. No.: 14/127,615

(22) PCT Filed: Jun. 19, 2012

(86) PCT No.: PCT/EP2012/061715
§ 371 (c)(1),
(2), (4) Date: Dec. 19, 2013

(87) PCT Pub. No.: WO2012/175500
PCT Pub. Date: Dec. 27, 2012

(65) Prior Publication Data
US 2014/0137700 A1  May 22, 2014

(30) Foreign Application Priority Data

Jun. 22, 2011 (DE) .................... 10 2011 110 288
Sep. 9, 2011 (DE) .................... 10 2011 053 480

(51) Int. Cl.
*F16C 7/02* (2006.01)
*F16C 3/02* (2006.01)

(52) U.S. Cl.
CPC .............. *F16C 7/026* (2013.01); *F16C 3/026* (2013.01); *Y10T 29/49945* (2015.01); *Y10T 74/2142* (2015.01)

(58) Field of Classification Search
CPC ............... F16C 7/00; F16C 7/02; F16C 7/026
See application file for complete search history.

(56) References Cited

U.S. PATENT DOCUMENTS

| 4,693,140 A | 9/1987 | Stephan et al. |
| 5,350,611 A | 9/1994 | Franklin, III et al. |

(Continued)

FOREIGN PATENT DOCUMENTS

| DE | 33 31 021 A1 | 3/1984 |
| DE | 698 11 816 T2 | 2/2004 |

(Continued)

OTHER PUBLICATIONS

International Search Report from PCT/EP2012/061715 dated Oct. 22, 2012, 2 pgs.

*Primary Examiner* — Brian M O'Hara
(74) *Attorney, Agent, or Firm* — Rothwell, Figg, Ernst & Manbeck, P.C.

(57) ABSTRACT

The invention relates to a component for absorbing and/or transmitting mechanical forces and/or moments, comprising at least one dimensionally stable component element (12, 12', 12", 2'", 12""), which has at least one hollow-profiled section (14), and at least one hollow-profiled component element (16) consisting of fiber-reinforced plastic, which can be partially received by the hollow-profiled section (14) of the dimensionally stable component element (12, 12', 12", 12'", 12""), and can be arranged in a form-fitting manner in the hollow-profiled section (14) of the dimensionally stable component element (12, 12', 12", 12'", 12"") by means of raised portions (32, 32') which extend radially inwards and/or depressions (38, 38'), recesses or holes which extend radially outwards, wherein the inner circumference (24) of the hollow-profiled section (14) of the dimensionally stable component element (12, 12', 12", 12'", 12"") and the outer circumference (26) of the hollow-profiled component element (16) consisting of fiber-reinforced plastic correspond to each other or at least substan- (Continued)

tially correspond to each other. The invention further relates to a method for the production thereof and the use thereof.

18 Claims, 7 Drawing Sheets

(56) References Cited

U.S. PATENT DOCUMENTS

| | | | |
|---|---|---|---|
| 5,624,519 A | 4/1997 | Nelson et al. | |
| 8,904,904 B2* | 12/2014 | Stewart | B29C 70/38 74/579 R |
| 2008/0129041 A1* | 6/2008 | Allen | B29C 66/1142 285/55 |
| 2010/0096506 A1 | 4/2010 | Benthien | |

FOREIGN PATENT DOCUMENTS

| | | |
|---|---|---|
| DE | 20 2005 010 293 U1 | 10/2005 |
| DE | 10 2006 058377 A1 | 6/2008 |
| DE | 10 2006 058 377 B4 | 9/2010 |
| EP | 0 911 143 B1 | 10/1998 |

* cited by examiner

COMPONENT FOR ABSORBING AND/OR TRANSMITTING MECHANICAL FORCES AND/OR MOMENTS, METHOD FOR PRODUCING SAME AND USE THEREOF

CROSS REFERENCE TO RELATED APPLICATION

This application is a 35 U.S.C. 371 National Phase Entry Application from PCT/EP2012/061715, filed Jun. 19, 2012, which claims the benefit of German Patent Application Nos. 10 2011 110 288.8 filed Jun. 22, 2011 and 10 2011 053 480.6 filed on Sep. 9, 2011, the disclosures of which are incorporated herein in their entirety by reference.

This invention relates to a component for absorbing and/or transmitting mechanical forces and/or moments, a method for producing same and the use thereof.

Components of this kind are generally known. Only as an example, reference is made to DE 10 2006 058 377 B4 describing a rod for the structural reinforcement of an aircraft fuselage structure which is formed of two dimensionally stable component elements at both ends and one hollow-profiled component element consisting of fibre-reinforced plastic which is encased by the two dimensionally stable component elements. In practice, however, such components have all shown to be detrimental since their design is often complex, not sufficiently dimensionally stable and of relatively high weight, while being unable to absorb and transmit high forces and/or moments and consequently have no satisfactory strength and stiffness values. In addition, their lifespan is usually not very high and their production is extremely costly.

The object of this invention is therefore to provide a component for absorbing and/or transmitting mechanical forces and/or moments, by means of which the aforementioned disadvantages can be prevented, is therefore structurally particularly simple, compact, dimensionally stable and very lightweight at the same time, allows the transmission of high forces and moments and consequently has particularly high strength and stiffness, while having a high lifespan and being particularly cost-effective in its production, and to provide a method for its production and to facilitate its use.

This object is achieved in a surprisingly simple manner by the features of claim 1.

By means of the embodiment of the component for absorbing and/or transmitting mechanical forces and/or moments, comprising at least one dimensionally stable component element having at least one hollow-profiled section, and at least one hollow-profiled component element consisting of fibre-reinforced plastic, which can be partially received by the hollow-profiled section of the dimensionally stable component element, and can be arranged in a form-fitting manner in the hollow-profiled section of the dimensionally stable component element by means of raised portions which extend radially inwards and/or depressions which extend radially outwards, recesses or holes, wherein the inner circumference of the hollow-profiled section of the dimensionally stable component element and the outer circumference of the hollow-profiled component element consisting of fibre-reinforced plastic correspond to each other or—as a result of tolerance deviations that can never be fully excluded—at least substantially correspond to each other, a particularly simple and on top of that compact and dimensionally stable design of the component at a relatively low weight is achieved. Furthermore, an extremely reliable absorption respectively induction and/or transmission of forces and/or moments is facilitated. At the same time, the component in accordance with the invention has a particularly high strength and stiffness. Due to the fact that the inner circumference of the hollow-profiled section of the dimensionally stable component element and the outer circumference of the hollow-profiled component element consisting of fibre-reinforced plastic correspond to each other or at least substantially correspond to each other, it is ensured that the fibres of the hollow-profiled component element consisting of fibre-reinforced plastic are shaped in directional alignment. The shaping or laying is done without any creasing or wrinkling as the inner circumference of the hollow-profiled section of the dimensionally stable component element and the outer circumference of the hollow-profiled component element are the same, i.e. being mostly or virtually the same. Consequently, the fibres of the hollow-profiled component element consisting of fibre-reinforced plastic are not buckled, compressed, distorted or in any other way subjected to any permanent stress. At the same time, due to the form fit between the at least one dimensionally stable component element and the at least one hollow-profiled component element consisting of fibre-reinforced plastic as a result of the design of the component in accordance with the invention is achieved. This is one of the reasons why as a result, the component in accordance with the invention will have a much higher lifespan, as from the start any detrimental notch effect associated with frictional connection, other fault sources in the structure and resulting critical weak points that may lead to premature failure of the component as a whole, can be simply and safely excluded. Finally, the production of the component in accordance with the invention is extremely simple requiring little work input and therefore is particularly cost-effective.

Advantageous structural details of the component in accordance with the invention are described in claims 2 to 16.

According to the features of claim 2, the raised portions which extend radially inwards and/or the depressions which extend radially outwards, recesses or holes are arranged in an advantageous manner across the inner circumference of the hollow-profiled section of the dimensionally stable component element at an equal distance to each other.

In a highly preferred manner, the raised portions which extend radially inwards and/or the depressions which extend radially outwards, recesses or holes according to claim 3 are designed in an oblong, elongated, bead-like, finger-shaped, meandering, wedge-shaped, angled, circular, ellipsoid, elliptic, oval, triangular, quadrangular, square or rectangular, multangular, trapezoid, parallelogram-shaped or polygonal shape and/or as a combination of the above, which allows the absorption, power flow and transmission of tensile, compressive and torsional forces.

In accordance with the invention and corresponding to claim 4, it is provided that the raised portions which extend radially inwards and/or the depressions which extend radially outwards, recesses or holes are arranged axially and/or at an angle to the longitudinal axis of the dimensionally stable component element and of the hollow-profiled component element. This enables the component in accordance with the invention to transmit tensile, compressive and also torsional forces.

In an additional or alternative embodiment, the raised portions which extend radially inwards and/or the depressions which extend radially outwards, recesses or holes corresponding to claim 5 can be arranged across the inner circumference of the hollow-profiled section of the dimensionally stable component element in an offset position towards each other axially to the longitudinal axis of the dimensionally stable component element and of the hollow-profiled component element.

Another structural embodiment for the raised portions which extend radially inwards and/or the depressions which extend radially outwards, recesses or holes is proposed in claim 6. Accordingly, the raised portions and/or the depressions, recesses or holes are preferably equipped with continous transitions to/into the adjacent or neighbouring area(s). In other words, the raised portions and/or the depressions, recesses or holes pass over steady, i.e. "gently" or "smoothly", to/into the adjacent or neighbouring area(s) or fade out. Any edged, angular or sharp transitions, which may quickly lead to damage of the fibre-reinforced plastic and therefore to failure of the entire component element, are avoided.

Of particularly high importance are the structural measures of claim 7, according to which the inner circumference of the hollow-profiled section of the dimensionally stable component element and the outer circumference of the hollow-profiled component element when producing a development view of each cross-section through the hollow-profiled section of the dimensionally stable component element and the hollow-profiled component element perpendicular to their longitudinal axis have the same or substantially same length.

Preferably, the dimensionally stable component element at least partly, in particular in an area of its hollow-profiled section, and the hollow-profiled component element according to claim 8 have an outer circumference with the same shape and dimension.

Furthermore, it is within the framework of the invention that the dimensionally stable component element and/or the hollow-profiled component element according to claim 9 is/are designed in a lightweight and/or corrosion-resistant way.

Appropriately, the dimensionally stable component element according to claim 10 is made of metal, in particular of steel, stainless steel, aluminium, titanium, an alloy of the above, and/or made of plastic, in particular of polyimide (PI), polyoximethylene (POM) or polytetrafluorethylene (PTFE), with or without aluminium oxide, aluminium nitride, aramid, basalt, boron nitride, glass, graphite, carbon, nylon, polyethylene, polyester, silicon carbide, silicon nitride and/or ceramic fibre reinforcement, and/or a combination of the above.

According to the structural measures of claim 11 the dimensionally stable component element can be produced by milling, turning, grinding or similar surface treatment, casting or fine casting, drawing or deep drawing and/or, in particular subsequent, welding and/or a combination of the above.

Furthermore it is provided according to the invention that the dimensionally stable component element according to claim 12 is designed as a connecting or linking element, fitting, flange, insert coupling to join at least one hollow-profiled component element consisting of fibre-reinforced plastic, node element for a framework or framework structure or similar connector body, in particular with an articulated joint lug, articulated joint head or similar force and/or moment flow or transmission element.

Preferably, the hollow-profiled component element consisting of fibre-reinforced plastic according to claim 13 is reinforced with aluminium oxide, aluminium nitride, aramid, basalt, boron nitride, glass, graphite, carbon, nylon, polyethylene, polyester, silicon carbide, silicon nitride and/or ceramic fibres and/or a combination of the above and/or formed of fibre composite material.

Furthermore, it is within the framework of the invention that the hollow-profiled component element consisting of fibre-reinforced plastic according to claim 14 can be produced using a prepreg method, wet impregnation method or resin transfer moulding (RTM) method and/or a combination of the above or similar method for producing fibre composite bodies.

According to claim 15, the hollow-profiled component element consisting of fibre-reinforced plastic in its cross-section preferably is designed with a circular, ellipsoid, elliptic, oval, triangular, quadrangular, square or rectangular, multangular, trapezoid, parallelogram-shaped or polygonal shape and/or as any combination of the above.

In an advantageous manner, the dimensionally stable component element and/or the hollow-profiled component element consisting of fibre-reinforced plastic according to claim 16 is/are formed, in particular completely or partly, in an oblong, elongated, curved, meandering, wave-shaped, snake-shaped, angled, (semi) circular, (semi) ellipsoid, convoluted, bent shape and/or as a combination of the above. Accordingly, the dimensionally stable component element and/or the hollow-profiled component element can extend across its/their full length or across a part of it in an essentially axial or axis-parallel manner and/or have any other spatial shapes in a manner deviating from that.

Finally, it is provided according to the invention that the dimensionally stable component element and/or the hollow-profiled component element consisting of fibre-reinforced plastic according to claim 17 is/are arranged, in particular completely or partly, in at least one spatial plane. In other words, the dimensionally stable component element and/or the hollow-profiled component element can extend completely or partly in one single spatial plane or in several, in particular in two or three, spatial planes.

This object is achieved, with regard to a method, in a surprisingly simple manner by the features of claim 18.

By the embodiment of the method according to the invention for producing a component for the absorption and/or transmission of mechanical forces and/or moments comprising at least one dimensionally stable component element with a hollow-profiled section and at least one hollow-profiled component element consisting of fibre-reinforced plastic, wherein the at least one hollow-profiled component element consisting of fibre-reinforced plastic is inserted with one end partly into the hollow-profiled section of the dimensionally stable component element and received by the hollow-profiled section of the dimensionally stable component element, and subsequently is pressed with its outer circumference in a form-fitting manner onto/against the inner circumference of the dimensionally stable component element in the area of its hollow-shaped section by an inflatable element that is introduced into the hollow-profiled component element consisting of fibre-reinforced plastic by inflating the inflatable element after its introduction into the hollow-profiled component element consisting of fibre-reinforced plastic, in practice the extremely simple handling, requiring little work input and most of all being very cost-effective, has overall proven to be very beneficial, apart from the advantages already described in connection with the component in accordance with the invention, which the method in accordance with the invention all shows and develops further. This is of even higher importance since the component in accordance with the invention must be seen as a mass product that can be used in the most versatile and also most different kinds of applications.

Further advantageous details of the method in accordance with the invention are described in claims 19 to 22.

According to claim 19 it is provided in accordance with the invention that the hollow-profiled component element, before its end is being partly inserted into the hollow-profiled section of the dimensionally stable component element, is radially deformed in such a way that the outer circumference of the hollow-profiled component element is smaller than the inner circumference, in particular at raised portions being arranged along the inner circumference and extending radially inwards, of the dimensionally stable component element in the area of its hollow-shaped section.

In a further embodiment of the method according to the invention, the hollow-profiled component element according to claim 20 is pressed with its outer circumference in a form-fitting manner onto/against the inner circumference and onto/against the raised portions being arranged along the inner circumference and extending radially inwards and/or onto/against the depressions being arranged along the inner circumference and extending radially outwards, recesses or holes of the dimensionally stable component element in the area of its hollow-shaped section, wherein the inner circumference of the hollow-profiled section of the dimensionally stable component element and the outer circumference of the hollow-profiled component element correspond to each other or at least substantially correspond to each other.

According to the measures of claim 21, the hollow-profiled component element is pressurised by the inflatable element until it has fully cured.

In this connection, the hollow-profiled component element according to claim 22 is pressurised by the inflatable element preferably with a pressure of approximately 2 to approximately 10 bar, in particular of approximately 4 to approximately 8 bar, preferably of approximately 6 bar.

This object is still achieved, with regard to a use, by the features of claims 23 and 24.

According to claim 23, the component in accordance with the invention is used in a particularly advantageous manner in vehicles, in particular in aircraft or aerospace aircraft, preferably in aeroplanes and spacecraft, in particular in watercraft, preferably in a submarine or air cushion craft (hovercraft), or in particular in land vehicles, preferably in a motor car, people transport vehicle such as a bus or van, truck or camper van.

According to claim 24, the component in accordance with the invention is particularly suited for the absorption and/or transmission of mechanical forces and/or moments and in particular as struts or bars and/or tube or rod-shaped connecting elements and/or frameworks or framework structures and/or drive shafts transmitting mechanical tensile and compressive forces and/or torsional forces, preferably with at least one or several connector elements, articulated joint lugs, articulated joint head or similar force induction or transmission elements located at the end, in vehicles, preferably in aircraft and spacecraft as support or stabilising struts for the structural reinforcement of a fuselage structure, and in land vehicles as support or stabilising struts for the structural reinforcement of a vehicle body structure.

Further advantages and details of the invention are contained in the following description of preferred embodiments of the invention, and in connection with the drawings. The drawings are as follows:

In the following description of various embodiments of the component 10 in accordance with the invention for the absorption and/or transmission of mechanical forces and/or moments, similar components that correspond to each other are each provided with identical reference characters.

The component 10 in accordance with the invention is provided for the use in vehicles, in particular in aircraft or aerospace aircraft, preferably in aeroplanes and spacecraft, in particular in watercraft, preferably in a submarine or air cushion craft (hovercraft), or in particular in land vehicles, preferably in a motor car, people transport vehicle such as a bus or van, truck or camper van.

The component 10 in accordance with the invention is particularly suited for the absorption and/or transmission of mechanical forces and/or moments and in particular as struts and/or tube or rod-shaped connecting elements and/or frameworks or framework structures and/or drive shafts transmitting mechanical tensile and compressive forces and/or torsional forces, preferably with at least one or several connector elements, articulated joint lugs, articulated joint head or similar force flow or transmission elements located at the end, in vehicles, preferably in aircraft or spacecraft as support or stabilising struts for the structural reinforcement of a fuselage structure, and in land vehicles as support or stabilising struts for the structural reinforcement of a vehicle body structure.

A component 10 designed in accordance with the invention comprises at least one dimensionally stable component element 12, 12', 12", 12''', 12"" with at least one hollow-profiled section 14 and at least one hollow-profiled component element 16 consisting of fibre-reinforced plastic (see FIGS. 7A to 8B). In the following descriptions of embodiments of the invention, the hollow-profiled component element 16 in each case has a hollow cylindrical or approximately hollow cylindrical form.

In the embodiments of the component 10 in accordance with the invention according to FIGS. 1A to 8B, at least two dimensionally stable component elements 12, 12', 12", 12''', 12"" with each at least one hollow-profiled section 14 and one hollow-profiled component element 16 consisting of fibre-reinforced plastic are provided. The hollow-profiled component element 16 is situated between the two dimensionally stable component elements 12. In this manner, the component 10 in accordance with the invention is designed, for example, as a hybrid strut or hybrid framework (structure).

Since the at least two dimensionally stable component elements 12, 12', 12", 12''', 12"" are designed exactly identical, in the entire description of various embodiments of the component 10 in accordance with the invention, for the sake of simplicity in each case one single dimensionally stable component element 12, 12', 12", 12''', 12"" with the hollow-profiled section 14 and the hollow-profiled component element 16 is described without limiting the scope of protection hereto.

The hollow-profiled component element 16 can be partially received by the hollow-profiled section 14 of the dimensionally stable component element 12, 12', 12", 12''', 12"". One end 18 of the dimensionally stable component element 12, 12', 12", 12''', 12"" and one end 20 of the hollow-profiled component element 16 which is facing the end 18 of the dimensionally stable component element 12, 12', 12", 12''', 12"" are inserted or slid into each other along their longitudinal axis 22. The inner circumference 24 of the hollow-profiled section 14 of the dimensionally stable component element 12, 12', 12", 12''', 12"" or of a part of it and the outer circumference 26 of the hollow-profiled component element 16 are resting against each other in the process.

The hollow-profiled component element 16 can be arranged in a form-fitting manner in the hollow-profiled section 14 of the dimensionally stable component element 12, 12', 12", 12''', 12"". The inner circumference 24 of the hollow-profiled section 14 of the dimensionally stable component element 12, 12', 12", 12''', 12"" and the outer circumference 26 of the hollow-profiled component element 16 are identical to each other, at least substantially identical, i.e. they match each other in form and dimension.

Figure 1A:
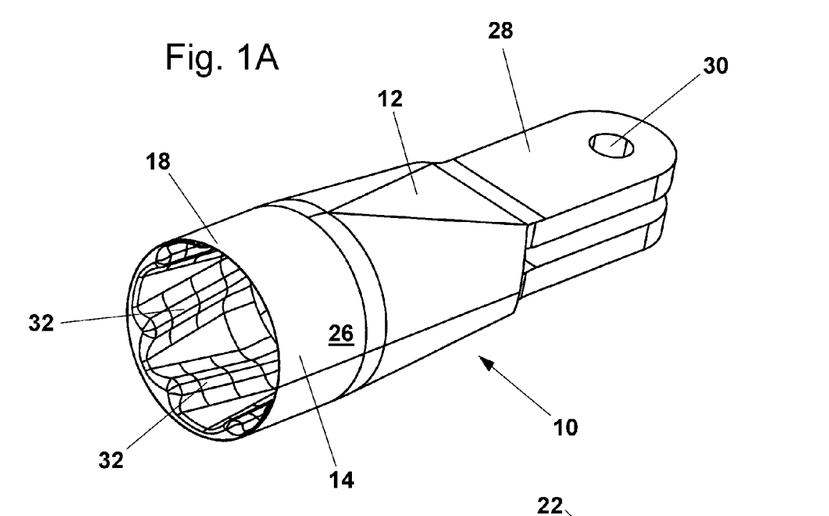
FIG. 1A a schematic perspective view of an embodiment of a component designed in accordance with the invention with a dimensionally stable component element with a hollow-profiled section, FIGS. 1B and 1C a side view and a horizontal lengthwise section view through the embodiment of the dimensionally stable component element designed in accordance with the invention according to FIG. 1A, FIG. 2 a schematic view of a developed, cut-open surface of the inner circumference of a dimensionally stable component element in the area of the hollow-profiled section of the dimensionally stable component element, FIGS. 3A and 3B a schematic cross-section view through the hollow-profiled component element consisting of fibre-reinforced plastic and development view of its outer circumference, FIGS. 4A to 4D a schematic cross-section view through the hollow-profiled section of the dimensionally stable component element along the line IVA-IVA in FIG. 2 and development view of its inner circumference, with and without dimensionally stable component element and schematically along its longitudinal extension, FIG. 5A a schematic perspective view of another embodiment of a component designed in accordance with the invention with a dimensionally stable component element with a hollow-profiled section according to FIG. 1A, FIG. 5B a schematic development view of the inner circumference of the hollow-profiled section of the dimensionally stable component element according to FIG. 5A in the area of the hollow-profiled section, FIGS. 6A to 6C a schematic perspective view, a side view and a cross-section view through another embodiment of a component designed in accordance with the invention with a dimensionally stable component element with a hollow-profiled section according to FIG. 1A along the line VIC-VIC in FIG. 6B, FIG. 6D a schematic development view of the inner circumference of the hollow-profiled section of the dimensionally stable component element according to FIG. 6A to 6C in the area of the hollow-profiled section, FIGS. 7A and 7B a schematic perspective view and a side view of yet another embodiment of a component designed in accordance with the invention with a dimensionally stable component element with a hollow-profiled section according to FIG. 1A, FIG. 7C a schematic development view of the inner circumference of the hollow-profiled section of the dimensionally stable component element according to FIGS. 7A and 7B in the area of the hollow-profiled section, and FIGS. 8A and 8B schematic perspective views of two other embodiments of a component designed in accordance with the invention with a dimensionally stable component element as connecting or linking element in the form of a framework or framework structure.
Figure 1B:
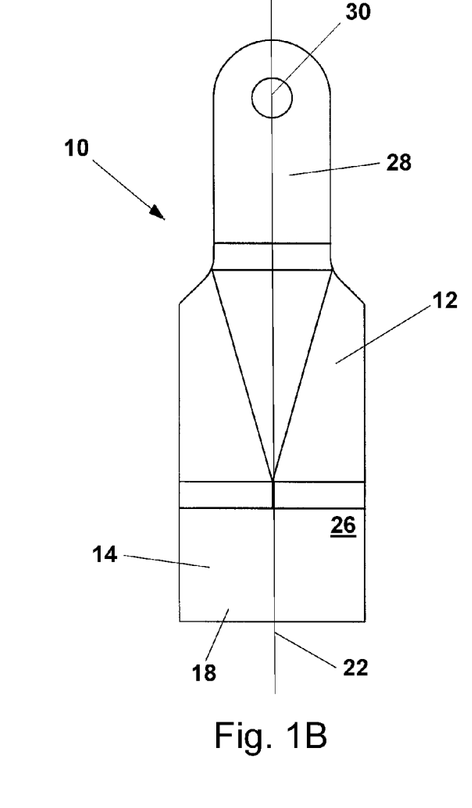
Figure 1C:
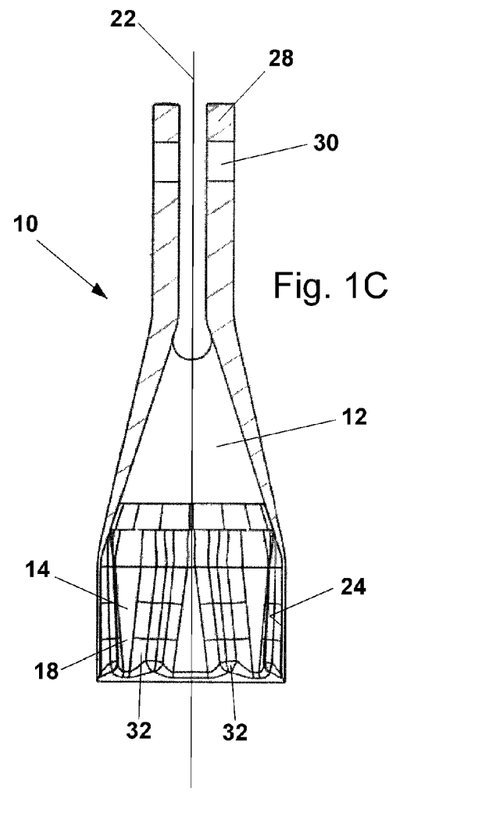

FIGS. 1A to 1C show a first embodiment of a component 10 in accordance with the invention with a dimensionally stable component element 12 that comprises a hollow-profiled section 14. The dimensionally stable component element 12 is provided as a connecting or linking element, fitting, flange, insert coupling to join at least one hollow-profiled component element 16 consisting of fibre-reinforced plastic or similar connector body or similar force and/or moment induction or transmission element and designed accordingly. In particular, the dimensionally stable component element 12 can be designed on one, specifically its other, end 28, which is facing away from the end 18 of the dimensionally stable component element 12 and thus also from the end 20 of the hollow-profiled component element 16, for example in a bifurcated shape and equipped with a connector element 30 in the form of an articulated joint lug, articulated joint head or similar fitting.

With the embodiment shown in FIGS. 1A to 1C, raised portions 32 in the hollow-profiled section 14 of the dimensionally stable component element 12 are provided. The raised portions 32 extend radially inwards along or across the inner circumference 24 towards the longitudinal axis 22 of the dimensionally stable component element 12 and of the hollow-profiled component element 16.

With the embodiment shown in FIGS. 1A to 1C of the dimensionally stable component element 12 of the component 10 in accordance with the invention, a plurality of raised portions 32 are provided. The raised portions 32 are essentially designed in an oblong, elongated, bead-like, finger-shaped or wedge-shaped form. Preferably, the raised portions 32, as shown in the example of embodiment of FIGS. 1A to 1C, are arranged at an equal distance towards each other across the inner circumference 24 of the hollow-profiled section 14 of the dimensionally stable component element 12. By means of such an even spreading, an evenly distributed force and moment absorption or power flow and/or transmission across the entire inner circumference 24 of the hollow-profiled section 14 of the dimensionally stable component element 12 and outer circumference 26 of the hollow-profiled component element 16 is obtained.

As indicated in FIGS. 1A and 1C, the raised portions 32 are furthermore equipped with continous transitions to/into the adjacent or neighbouring area(s). In other words, the raised portions 32 pass over continously, i.e. "gently" or "smoothly", to/into the adjacent or neighbouring area(s) or fade out. Any edged, angular or sharp transitions, which may quickly lead to damage of the fibre-reinforced plastic and therefore to failure of the entire component element 12, are excluded.

Figure 2:
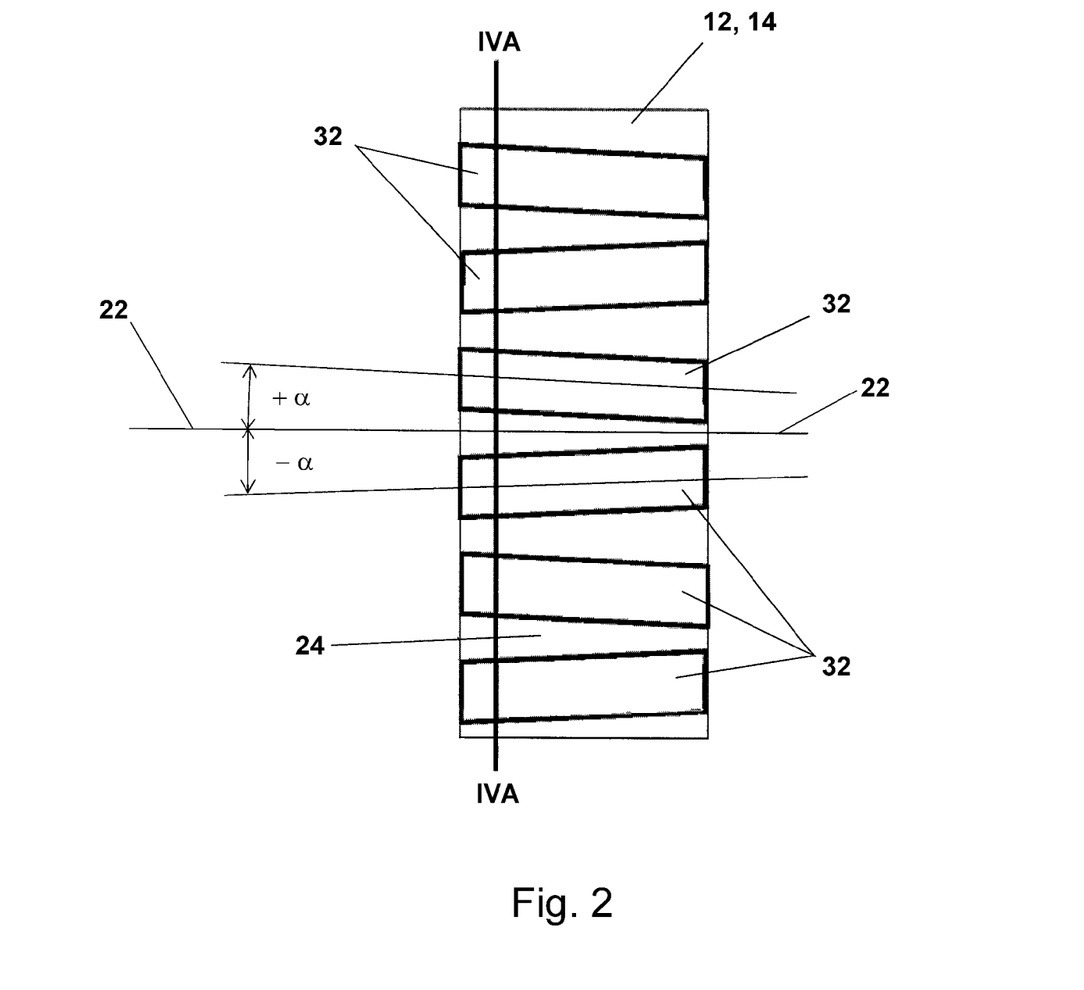

As can be seen in particular in FIG. 2 which shows a schematic development of the inner circumference 24 of the dimensionally stable component element 12, as an example six raised portions 32 are provided. The raised portions 32 are designed in an oblong shape and arranged at an angle ±α to the longitudinal axis 22 of the dimensionally stable component element 12 and of the hollow-profiled component element 16. As a result of the arrangement of the raised portions 32 at an angle ±α, tensile, compressive and torsional forces can be transmitted.

Figure 3A:
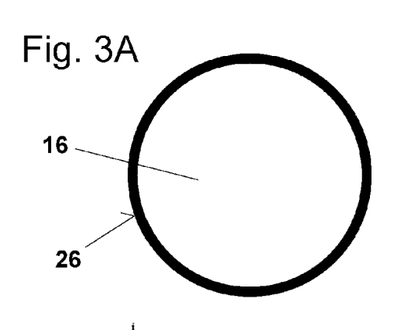
Figure 3B:
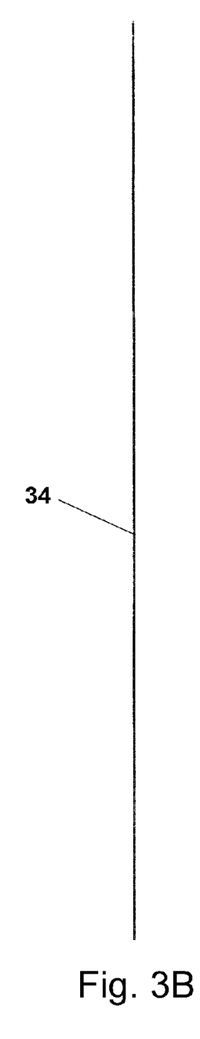

FIGS. 3A and 3B as well as 4A to 4D further illustrate the design of the component 10 in accordance with the invention. The inner circumference 24 of the hollow-profiled section 14 of the dimensionally stable component element 12 and the outer circumference 26 of the hollow-profiled component element 16 when producing a development drawing of each cross-section through the hollow-profiled section 14 of the dimensionally stable component element 12 and the hollow-profiled component element 16 perpendicular to their longitudinal axis 22 have the same or essentially same length 34 or 36, respectively.

FIGS. 3A to 4D could be based, for example, on a cross-section through the hollow-profiled section 14 of the dimensionally stable component element 12 and the hollow-profiled component element 16 similar to the line IVA-IVA in FIG. 2.

FIG. 3A shows a cross-sectional schematic view of the hollow-profiled component element 16. The resulting outer circumference 26 is developed in FIG. 3B and yields the length 34.

Figure 4A:
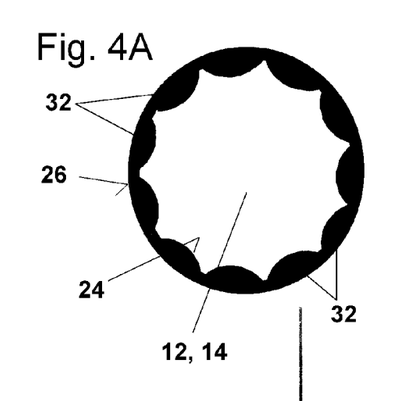
Figure 4B:
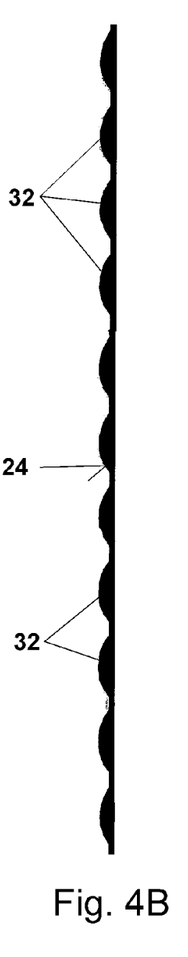
Figure 4C:
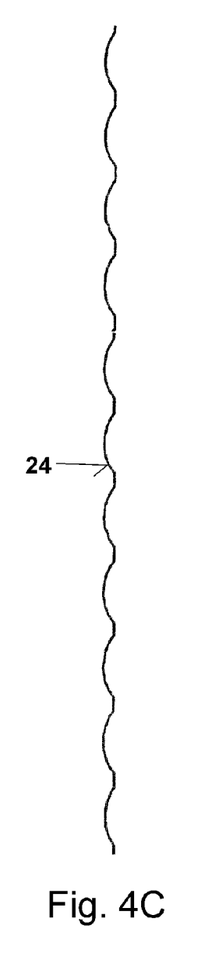
Figure 4D:
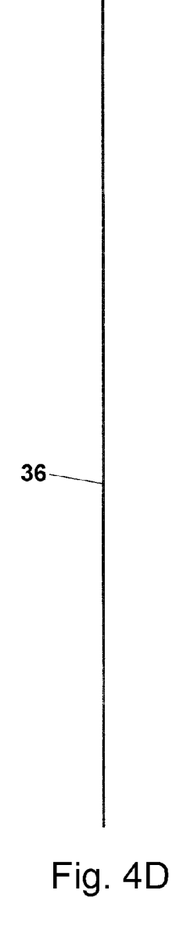

FIG. 4A shows a cross-sectional schematic view of the dimensionally stable component element 12 in the area of the hollow-profiled section 14. Along the inner circumference 24 of the section 14, a total of eleven raised portions 32 are arranged with an evenly distributed spacing. The resulting inner circumference 24 is developed in FIG. 4B together with the raised portions 32. The resulting inner circumference 24 is developed in FIG. 4C without the raised portions 32 and, after longitudinal extension according to FIG. 4D, yields the length 36. The lengths 34 and 36 are equal or identical, taking minor tolerance inaccuracies or tolerance deviations during production, which can never be excluded, into account are at least essentially and therefore virtually equal or identical.

Figure 5A:
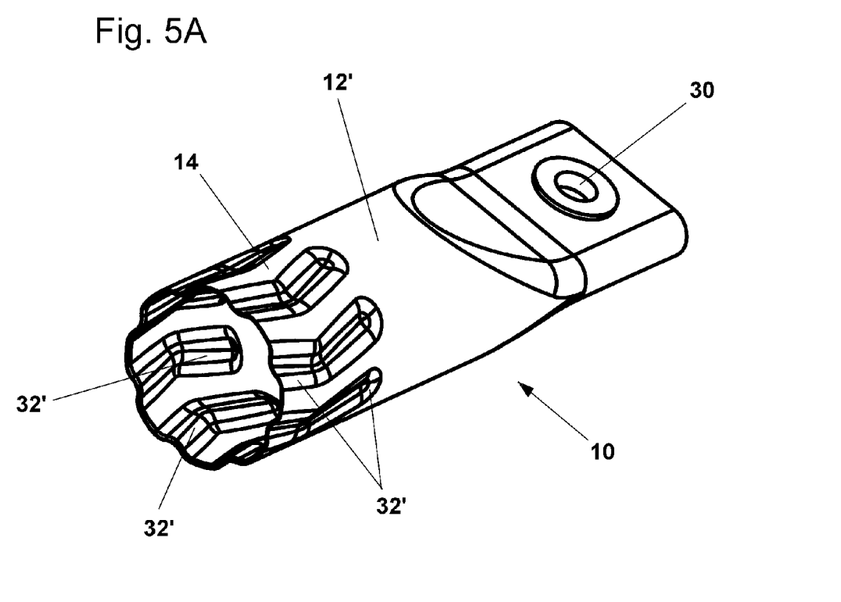
Figure 5B:
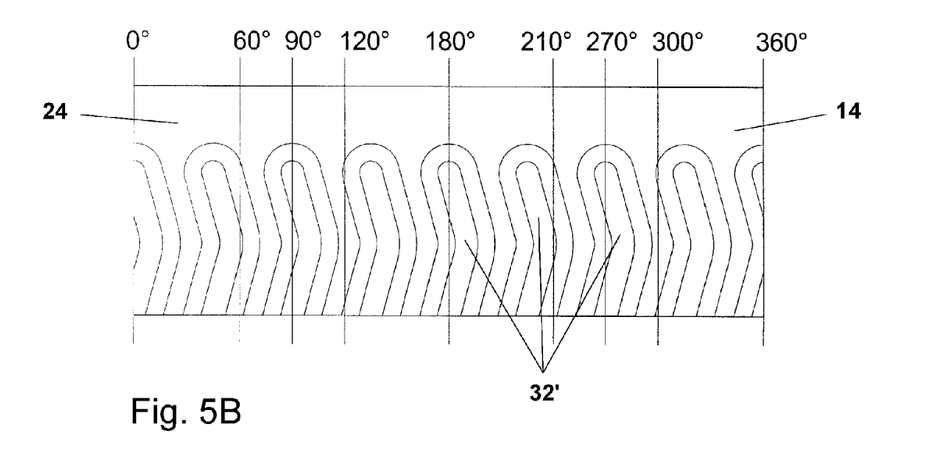
Figure 6A:
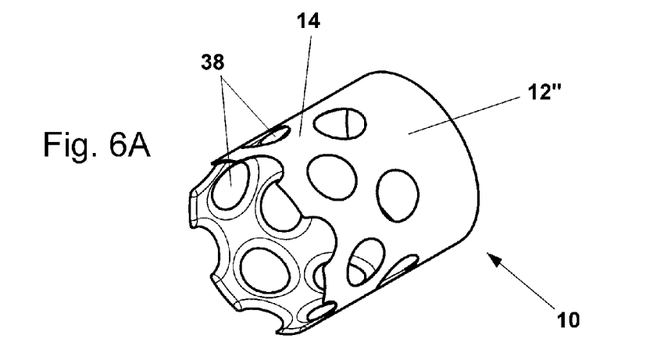
Figure 6B:
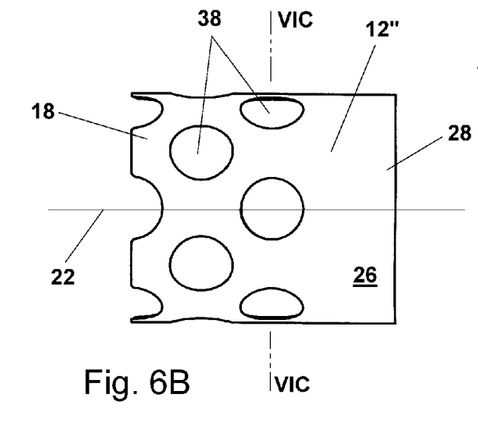
Figure 6C:
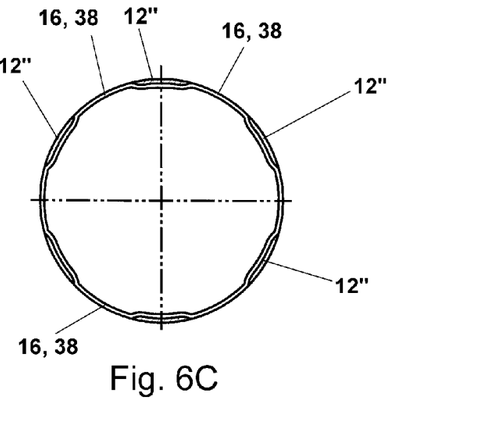
Figure 6D:
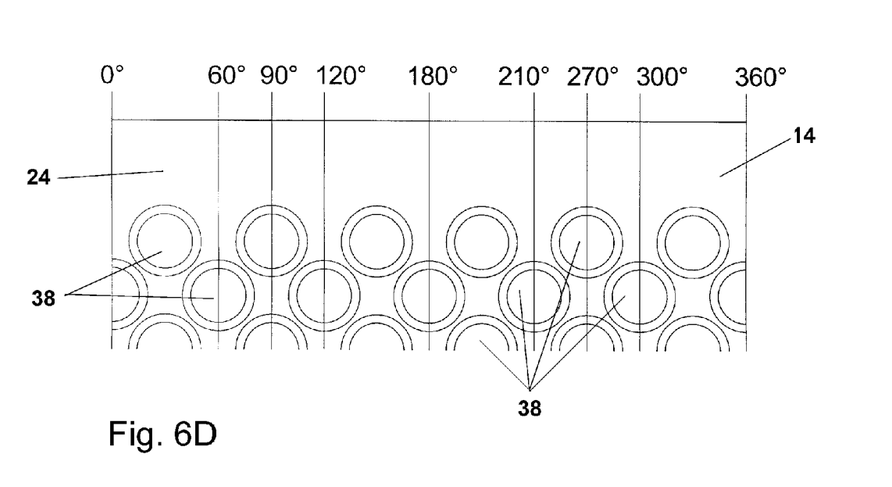

FIGS. 5A and 5B show another embodiment of a component 10 in accordance with the invention with a dimensionally stable component element 12'.

In the embodiment of the dimensionally stable component element 12' shown in FIGS. 5A and 5B, raised portions 32' are provided that extend radially inwards, are designed in an angled or meandering (not shown) shape and are arranged axially or parallel to the longitudinal axis 22 of the dimensionally stable component element 12 and of the hollow-profiled component element 16. The raised portions 32' are, for example, twisted in opposing direction by an angle of 10 degrees to the longitudinal axis 22. Due to the angled design of the raised portions 32', also tensile, compressive and torsional forces can be transmitted.

An additional structural difference compared to the embodiment of FIGS. 1A to 1C is that the dimensionally stable component element 12' is implemented in sheet metal version in the embodiment of FIGS. 5A and 5B, while the embodiment of the component 10 in accordance with the invention according to FIGS. 1A to 1C is designed as an integral milled part.

FIGS. 6A to 6D propose another embodiment of a component 10 in accordance with the invention with a dimensionally stable component element 12".

In an alternative or additional embodiment with regard to the raised portions 32, 32' corresponding to the examples of embodiment of the component 10 in accordance with the invention presented in FIGS. 1A to 1C and 5A, 5B, depressions 38, recesses or holes which extend radially outwards can be arranged in the hollow-profiled section 14 of the dimensionally stable component element 12".

By means of such depressions 38, recesses or holes, a similar form fit as in the previously shown examples of embodiment of FIGS. 1A to 1C and 5A, 5B due to the raised portions 32, 32' can be achieved, wherein the inner circumference 24 of the hollow-profiled section 14 of the dimensionally stable component element 12" and the outer circumference 26 of the hollow-profiled component element 16 equally correspond to each other or again at least substantially correspond to each other.

The depressions 38, recesses or holes which extend radially outwards are also arranged at an equal distance towards each other across the inner circumference 24 of the hollow-profiled section 14 of the dimensionally stable component element 12". As can be seen in FIGS. 6A to 6D, the depressions 38, recesses or holes are designed in a circular shape in this example of embodiment. This also facilitates the transmission of tensile, compressive and torsional forces.

FIGS. 6A to 6D also show that two rows of depressions 38, recesses or holes are provided which additionally are arranged in an offset position towards each other across the inner circumference 24 axially to the longitudinal axis 22 of the dimensionally stable component element 12" and of the hollow-profiled component element 16.

Figure 7A:
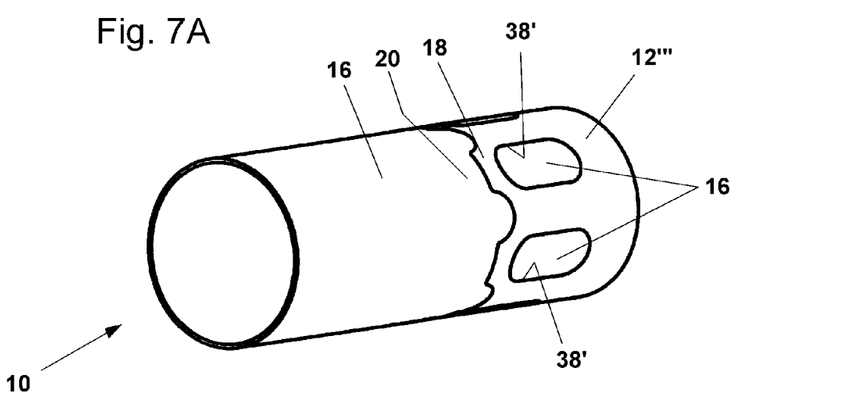
Figure 7B:
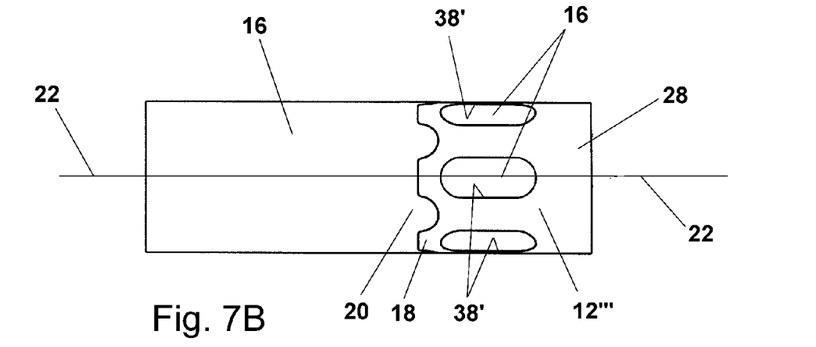
Figure 7C:
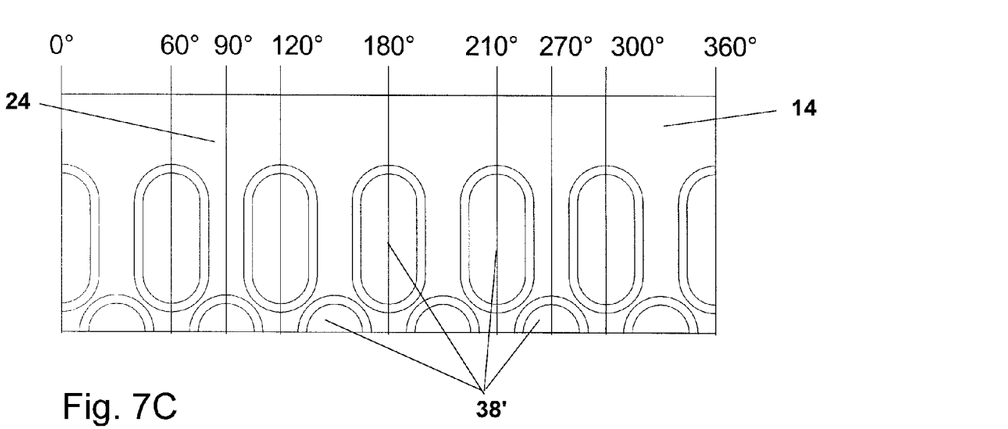

FIGS. 7A and 7B show yet another embodiment of a component 10 in accordance with the invention with a dimensionally stable component element 12'''.

With the embodiment shown in FIGS. 7A and 7B of the dimensionally stable component element 12''', also depressions 38', recesses or holes are realised. The depressions 38' are designed in an oblong shape or in the form of an elongated hole and arranged axially to the longitudinal axis 22 of the dimensionally stable component element 12''' and of the hollow-profiled component element 16. With this embodiment, also tensile, compressive and torsional forces can be transmitted equally.

Figure 8A:
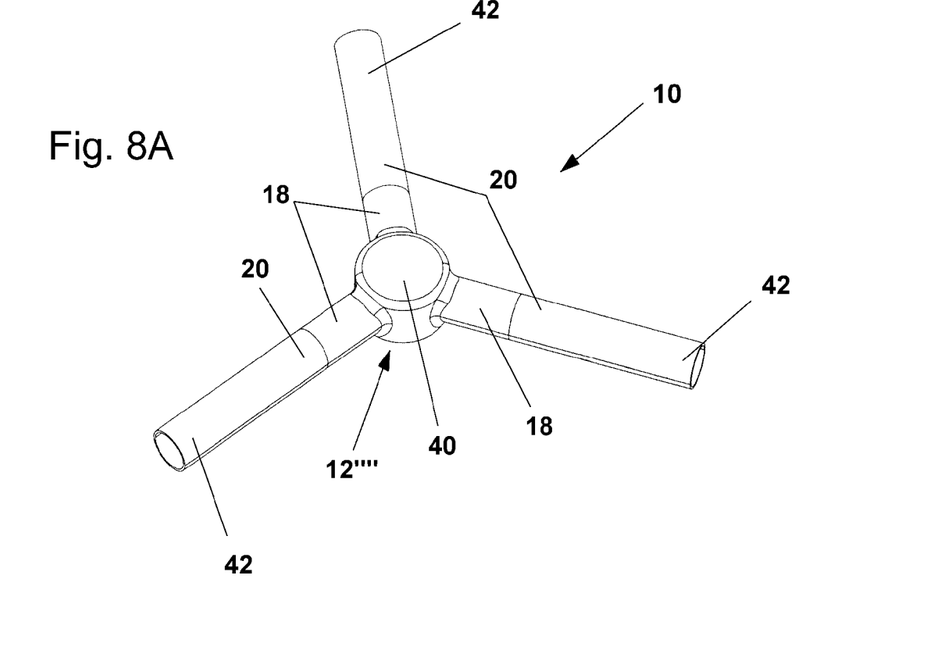
Figure 8B:
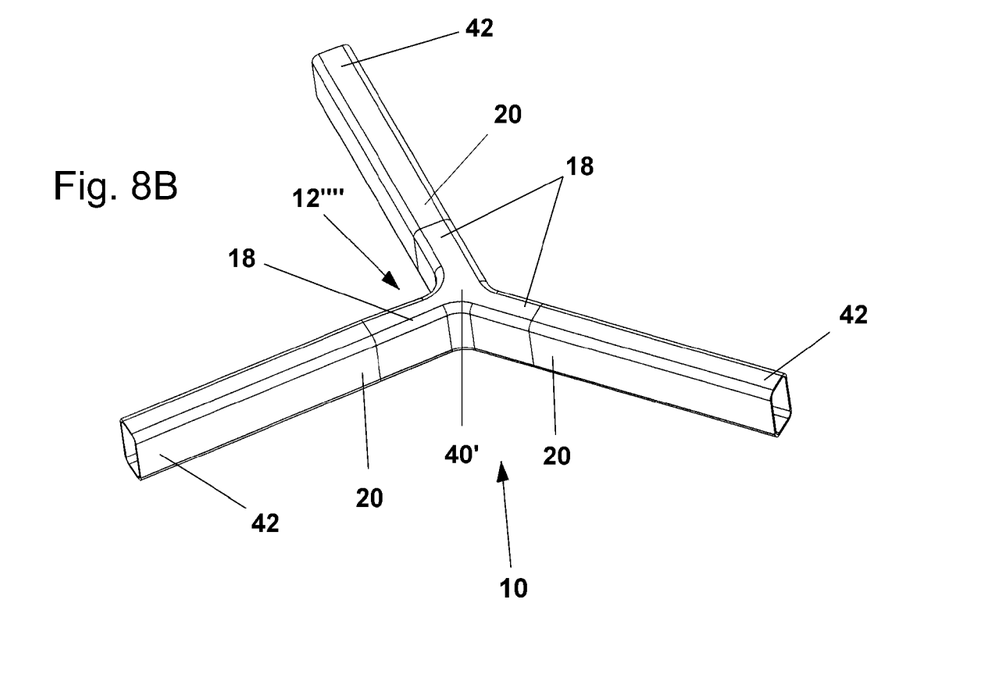

Finally, FIGS. 8A and 8B show yet other examples of embodiment of a component 10 in accordance with the invention with a dimensionally stable component element 12'''' in the form of a framework or framework structure respectively for a framework or framework structure. Here, a central node element 40, 40' is provided by which at least two, here a total of three, hollow-profiled component elements 16 with their one end 20 are each received and supported. The three hollow-profiled component elements 16 each extend away from the associated node element 40, 40' in an approximately star-shaped pattern and on their other end 42 connect to separate dimensionally stable component elements 12, 12', 12", 12''', 12'''' (not shown). These component elements 12, 12', 12", 12''', 12'''' can be separate component elements 12, 12', 12", 12''' etc. or other component elements 12'''' with node elements 40, 40', depending on the individual application purpose.

The two embodiments of the component 10 according to FIGS. 8A and 8B only differ from each other in the form of the node elements 40, 40' of the component elements 12'''' to each other, in the form of the cross-section of the hollow-profiled component elements 16 which in one case are designed in a tube shape and in the other case in a quadranular or octagonal, respectively, shape, and in the angle arrangement of the component elements 12'''' to each other, i.e. with a regular spreading of 120 degrees each or with an irregular spreading of 100 degrees, 130 degrees and 130 degrees.

Without being shown in detail, it is also possible to arrange the raised portions 32, 32' which extend radially inwards and/or the depressions 38, 38', recesses or holes which extend radially outwards in any other layout and embodiment than the embodiments presented in FIGS. 1A to 8B, for example in an oblong, elongated, bead-like, finger-shaped, meandering, wedge-shaped, angled, circular, ellipsoid, elliptic, oval, triangular, quadrangular, square or rectangular, multangular, trapezoid, parallelogram-shaped or polygonal shape and/or as a combination of the above, and/or axially and/or at an angle ±α to the longitudinal axis 22 of the dimensionally stable component element 12, 12', 12", 12''', 12'''' and of the hollow-profiled component element 16.

The dimensionally stable component element 12, 12', 12", 12''', 12'''' and the hollow-profiled component element 16 have, appropriately, an outer circumference 26 with the same shape and dimension. The same applies for the dimensionally stable component element 12 at least partially for an area of its hollow-profiled section 14.

The dimensionally stable component element 12, 12', 12", 12''', 12'''' and/or the hollow-profiled component element 16 is/are designed in a lightweight and/or corrosion-resistant way.

The dimensionally stable component element 12, 12', 12", 12''', 12'''' itself is made of metal, in particular of steel, stainless steel, aluminium, titanium or an alloy of the above. Regardless of the above, alternatively or additionally the dimensionally stable component element 12 can be made of plastic, in particular of polyimide (PI), polyoximethylene (POM) or polytetrafluorethylene (PTFE), with or without aluminium oxide, aluminium nitride, aramid, basalt, boron nitride, glass, graphite, carbon, nylon, polyethylene, polyester, silicon carbide, silicon nitride and/or ceramic fibre reinforcement, and/or a combination of the above.

Furthermore, the dimensionally stable component element 12, 12', 12", 12''', 12'''' can be produced by milling, turning, grinding or similar surface treatment, casting or fine casting, drawing or deep drawing and/or, in particular subsequent, welding and/or a combination of the above. As an example, it can be envisaged to manufacture components of the dimensionally stable component element 12 initially by means of machining and then to weld those manufactured components together. It is also possible to initially draw or deep draw components of the dimensionally stable component element 12, to weld them together subsequently and finally to perform another surface treatment via milling, turning or grinding.

The hollow-profiled component element 16 consisting of fibre-reinforced plastic itself is reinforced with aluminium oxide, aluminium nitride, aramid, basalt, boron nitride, glass, graphite, carbon, nylon, polyethylene, polyester, silicon carbide, silicon nitride and/or ceramic fibres and/or a combination of the above. Alternatively or additionally, the hollow-profiled component element 16 can also be formed of fibre composite material.

The hollow-profiled component element 16 consisting of fibre-reinforced plastic can be produced using a prepreg method, wet impregnation method or resin transfer moulding (RTM) method and/or a combination of the above or similar method for producing fibre composite bodies.

Furthermore, the hollow-profiled component element 16 consisting of fibre-reinforced plastic is designed in its cross-section with a circular, ellipsoid, elliptic, oval, triangular, quadrangular, square or rectangular, multangular, trapezoid, parallelogram-shaped or polygonal shape and/or as any combination of the above.

The production of the embodiments of the component 10 in accordance with the invention shown in FIGS. 1 to 7C is explained in more detail below:

The hollow-profiled component element 16 is inserted partially with the end 20 into the hollow-profiled section 14 of the dimensionally stable component element 12, 12', 12", 12''' at its end 18 and received by the hollow-profiled section 14 of the dimensionally stable component element 12.

Before being partially inserted or slid in with its end 20 into the hollow-profiled section 14 of the dimensionally stable component element 12, 12', 12", 12''', the hollow-profiled component element 16 is radially deformed. At this point in time, the hollow-profiled component element 16 is still uncured and therefore flexible and deformable. During the or through the radial deformation, for a short time the outer circumference 26 of the hollow-profiled component element 16 is becoming smaller than the inner circumference 24, in particular than the raised portions 32, 32' extending radially inwards and being arranged along the inner circumference 24, of the dimensionally stable component element 12 in the area of its hollow-shaped section 14.

After being partially inserted or slid in, the hollow-profiled component element 16 slightly distends again in the hollow-profiled section 14 of the dimensionally stable component element 12, 12', 12", 12''' and deforms back. The hollow-profiled component element 16 (slightly) rests with its outer circumference 26 onto or against the inner circumference 24 or, respectively, onto or against the raised portions 32, 32' being arranged along the inner circumference 24, which radially protrude inwards towards the longitudinal axis 22, and and/or depressions 38, 38' being arranged along the inner circumference 24, which extend radially outwards from the longitudinal axis 22, recesses or holes of the dimensionally stable component element 12, 12', 12", 12'''.

Then an inflatable element (not shown), for example an inflatable tube, is inserted or introduced into the hollow-profiled component element 16. After having been inserted into the hollow-profiled component element 16, the inflatable element is inflated. This has the effect that the hollow-profiled component element 16 is pressed by the inflatable element in a form-fitting manner with its outer circumference 26 onto/against the inner circumference 24 of the dimensionally stable component element 12, 12', 12", 12''' in the area of its hollow-profiled section 14.

The hollow-profiled component element 16 is pressed with its outer circumference 26 in a form-fitting manner onto/against the inner circumference 24 and onto/against the raised portions 32, 32' and/or depressions 38, 38', recesses or holes of the dimensionally stable component element 12 which are arranged along the inner circumference 24 in the area of the hollow-profiled section 14 and extend radially inwards or outwards, respectively. In doing so, the inner circumference 24 of the hollow-profiled section 14 of the dimensionally stable component element 12, 12', 12", 12''' and the outer circumference 26 of the hollow-profiled component element 16 correspond to each other or at least substantially correspond to each other.

The shaping or laying is therefore done without any creasing of the hollow-profiled component element 16. Consequently, the fibres of the hollow-profiled component element 16 are not kinked, compressed, distorted or in any other way subjected to any permanent stress.

The hollow-profiled component element 16 is pressurised by the inflatable element until it has fully cured. To ensure a good contact or moulding of the hollow-profiled component element 16 against the dimensionally stable component element 12, 12', 12", 12''', the hollow-profiled component element 16 is pressurised by the inflatable element with a pressure of approximately 2 to approximately 10 bar, in particular from approximately 4 to approximately 8 bar. In practice a pressure of approximately 6 bar has proven most beneficial.

After curing, the inflatable element is extracted again from the hollow-profiled component element 16 and the component 10 is passed on for further processing.

The production of the embodiments of the component 10 in accordance with the invention shown in FIGS. 8A and 8B is done accordingly, however, by repeated handling, as the dimensionally stable component element 12'''' has several of such node elements 40, 40', and vice versa.

The invention is not limited to the shown embodiments of the component 10 in accordance with the invention. It is thus possible without any difficulty to equip the component 10 in accordance with the invention with a dimensionally stable component element in the form of an insert coupling (not shown) to connect two hollow-profiled component elements 16 consisting of fibre-reinforced plastic. The two hollow-profiled component elements 16 are then at each of their ends facing away from the insert coupling fitted with a dimensionally stable component element 12 that acts as a connector body with a connector element 30 in the form of an articulated joint lug, articulated joint head or the like force and/or moment induction or transmission element. In this way, the length of the component 10 in accordance with the invention can be modified as required.

Furthermore it is possible without any difficulty and is equally within the scope of protection of the invention that the component 10 in accordance with the invention respectively the dimensionally stable component element 12, 12', 12", 12''', 12'''' and/or the hollow-profiled component element 16 consisting of fibre-reinforced plastic is/are formed, in particular completely or partly, in an oblong, elongated, curved, meandering, wave-shaped, snake-shaped, angled, (semi) circular, (semi) ellipsoid, convoluted, bent shape and/or as a combination of the above. The form of the component 10 respectively of the dimensionally stable component element 12, 12', 12", 12''', 12'''' and/or the hollow-profiled component element 16 can have any desired shape and can be individually adjusted to the relevant application and function as well as spatial requirements. Consequently, the component 10 respectively the dimensionally stable component element 12, 12', 12", 12''', 12'''' and/or the hollow-profiled component element 16 can extend across its/their full length or across a part of it in an essentially axial or axis-parallel manner and/or have any other spatial shapes in a manner deviating from that. Without being shown in detail, the component 10 respectively the dimensionally stable component element 12, 12', 12", 12''', 12'''' and/or the hollow-profiled component element 16 can be arranged, in particular completely or partly, in at least one spatial plane. In other words, the component 10 respectively the dimensionally stable component element 12, 12', 12", 12''', 12'''' and/or the hollow-profiled component element 16 can extend in one single spatial plane or in several, in particular in two or three, spatial planes, and in any way completely or partly. This is especially advantageous to design the component 10 in accordance with the invention overall as a connecting or linking element, fitting, flange, insert coupling to join at least one hollow-profiled component element 16 consisting of fibre-reinforced plastic, node element 40, 40' for a framework or framework structure or similar connector body, in particular with an articulated joint lug, articulated joint head or similar force induction or transmission element.

Without being shown in detail, it is eventually also absolutely conceivable to modify the raised portions 32, 32' and/or the depressions 38, 38', recesses or holes of the above-described various embodiments of the component 10 in accordance with the invention with regard to their number, spreading, arrangement, design, shape and dimensions in any arbitrary way and/or to combine them with each other in a similar way. At last, the raised portions 32, 32' which extend radially inwards and/or the depressions 38, 38', recesses or holes which extend radially outwards can be shaped in any arbitrary way, in particular for example in an oblong, elongated, bead-like, finger-shaped, meandering, wedge-shaped, angled, circular, ellipsoid, elliptic, oval, triangular, quadrangular, square or rectangular, multangular, trapezoid, parallelogram-shaped or polygonal shape and/or as a combination of the above.

The invention claimed is:

1. A component for transmission and absorption of mechanical forces and moments, the component comprising:
   at least one dimensionally stable component element (12, 12', 12", 12''', 12'''') having at least one hollow-profiled section (14) extending along a longitudinal axis of the dimensionally stable component element (12, 12', 12", 12''', 12''''), and
   at least one hollow-profiled component element (16) consisting of fibre-reinforced plastic extending along a longitudinal axis of the hollow-profiled component element (16),
   wherein the hollow-profiled component element (16) is partially received by the hollow-profiled section (14) of the dimensionally stable component element (12, 12', 12", 12''', 12''''),
   wherein at least one of the hollow-profiled component element (16) and the dimensionally stable component element (12, 12', 12", 12''', 12'''') comprises one or more raised portions (32, 32') which extend radially inwards toward the longitudinal axes of the dimensionally stable component element (12, 12', 12", 12''', 12'''') and the hollow-profiled component element (16), depressions (38, 38') which extend radially outwards from the longitudinal axes of the dimensionally stable component element (12, 12', 12", 12''', 12'''') and the hollow-profiled component element (16), recesses or holes, so that the hollow-profiled component element (16) is received in a form-fitting manner in the hollow-profiled section (14) of the dimensionally stable component element (12, 12', 12", 12''', 12''''),
   wherein an inner circumference (24) of the hollow-profiled section (14) of the dimensionally stable component element (12, 12', 12", 12''', 12'''') at least substantially corresponds to an outer circumference (26) of the hollow-profiled component element (16) consisting of fibre-reinforced plastic,
   wherein the inner circumference (24) of the hollow-profiled section (14) of the dimensionally stable component element (12) and the outer circumference (26) of the hollow-profiled component element (16) have substantially the same length (34, 36),
   wherein each of the one or more raised portions (32, 32'), depressions (38, 38'), recesses, and holes are separated from each other in the circumferential direction along the hollow-profiled section (14) of the dimensionally stable component element (12) and the hollow-profiled component element (16).

2. The component according to claim 1, wherein one or more raised portions (32, 32'), depressions (38, 38'), recesses, and holes are arranged across the inner circumference (24) of the hollow-profiled section (14) of the dimensionally stable component element (12, 12', 12", 12''', 12'''') at an equal distance to each other.

3. The component according to claim 1, wherein the one or more raised portions (32, 32'), depressions (38, 38'), recesses, and holes are designed in an oblong, elongated, bead-like, finger-shaped, wedge-shaped, angled, circular, ellipsoid, elliptic, oval, triangular, quadrangular, square, rectangular, multangular, trapezoid, parallelogram-shaped, polygonal shape, or as a combination thereof.

4. The component according to claim 1, wherein the one or more raised portions (32, 32'), depressions (38, 38'), recesses, and holes are arranged axially or at an angle (±α) to the longitudinal axes (22) of the dimensionally stable component element (12, 12', 12", 12''', 12'''') and the hollow-profiled component element (16).

5. The component according to claim 1, wherein the one or more raised portions (32, 32'), depressions (38, 38'), recesses, and holes are arranged in an offset position to each other across the inner circumference (24) of the dimensionally stable component element (12, 12', 12", 12'", 12"") axially to the longitudinal axes (22) of the dimensionally stable component element (12, 12', 12", 12'", 12"") and the hollow-profiled component element (16).

6. The component according to claim 1, wherein the one or more raised portions (32, 32'), depressions (38, 38'), recesses, and holes are designed with continuous transitions toward an area adjacent to at least one of the raised portions (32, 32'), depressions (38, 38'), recesses, and holes.

7. The component according to claim 1, wherein at least a part of the dimensionally stable component element (12, 12', 12", 12'", 12"") including an area of the hollow-profiled section (14) and the hollow-profiled component element (16) have an outer circumference (26) with the same shape and dimension.

8. The component according to claim 1, wherein at least one of the dimensionally stable component element (12, 12', 12", 12'", 12"") and the hollow-profiled component element (16) is designed in at least one of a lightweight and corrosion-resistant way.

9. The component according to claim 1, wherein the dimensionally stable component element (12, 12', 12", 12'", 12"") is made by one or more of:
  a metal, steel, stainless steel, aluminum, or titanium, or an alloy of the above,
  a plastic, polyimide (PI), polyoximethylene (POM) or polytetrafluorethylene (PTFE),
  with or without aluminum oxide, aluminum nitride, aramid, basalt, boron nitride, glass, graphite, carbon, nylon, polyethylene, polyester, silicon carbide, silicon nitride and/or ceramic fibre reinforcement,
  or a combination thereof.

10. The component according to claim 1, wherein the dimensionally stable component element (12, 12', 12", 12'", 12"") can be produced by milling, turning, grinding, casting or fine casting, drawing or deep drawing, welding, or a combination thereof.

11. The component according to claim 1, wherein the dimensionally stable component element (12, 12', 12", 12'", 12"") is designed as a connecting or linking element (30), fitting, flange, insert coupling to join the at least one hollow-profiled component element (16) consisting of fibre-reinforced plastic, node element (40, 40') for a framework or framework structure or connector body with or without an articulated joint lug or articulated joint head.

12. The component according to claim 1, wherein the hollow-profiled component element (16) consisting of fibre-reinforced plastic is reinforced with aluminum oxide, aluminum nitride, aramid, basalt, boron nitride, glass, graphite, carbon, nylon, polyethylene, polyester, silicon carbide, silicon nitride, ceramic fibres or a combination thereof or is formed of fibre composite material.

13. The component according to claim 1, wherein the hollow-profiled component element (16) consisting of fibre-reinforced plastic can be produced using a prepreg method, wet impregnation method, resin transfer moulding (RTM) method or a combination thereof.

14. The component according to claim 1, wherein the hollow-profiled component element (16) consisting of fibre-reinforced plastic is designed in its cross-section with a circular, ellipsoid, elliptic, oval, triangular, quadrangular, square, rectangular, multangular, trapezoid, parallelogram-shaped, polygonal shape or any combination thereof.

15. The component according to claim 1, wherein at least one of the dimensionally stable component element (12, 12', 12", 12'", 12"") and the hollow-profiled component element (16) consisting of fibre-reinforced plastic are formed at least partly in an oblong, elongated, curved, wave-shaped, snake-shaped, angled, circular, semicircular, ellipsoid, semi-ellipsoid, or any combination thereof.

16. The component according to claim 1, wherein the at least one dimensionally stable component element (12, 12', 12", 12'", 12"") and the at least one hollow-profiled component element (16) are arranged to form a framework.

17. The component according to claim 1 further comprising a connector element (30) at an end of the at least one dimensionally stable component element (12, 12', 12", 12'", 12""), wherein the connector element (30) is selected from a group consisting of articulated joint lugs, articulated joint heads and force flow or transmission elements.

18. The component according to claim 1, wherein the inner circumference (24) of the hollow-profiled section (14) of the dimensionally stable component element (12) and the outer circumference (26) of the hollow-profiled component element (16) when producing a development view of each cross-section through the hollow-profiled section (14) of the dimensionally stable component element (12, 12', 12", 12'", 12"") and the hollow-profiled component element (16) perpendicular to their longitudinal axis (22) have the same or substantially same length (34, 36).

* * * * *